United States Patent [19]

Johnson et al.

[11] Patent Number: 5,271,693
[45] Date of Patent: Dec. 21, 1993

[54] ENHANCED DEEP SOIL VAPOR EXTRACTION PROCESS AND APPARATUS FOR REMOVING CONTAMINANTS TRAPPED IN OR BELOW THE WATER TABLE

[75] Inventors: Paul C. Johnson, Houston, Tex.; David A. Weingaertner, Framingham, Mass.; Lynton W. R. Dicks; Arthur L. Otermat, both of Houston, Tex.; Arnold R. Marsden, Jr., Mount Vernon, Wash.

[73] Assignee: Shell Oil Company, Houston, Tex.

[21] Appl. No.: 958,844

[22] Filed: Oct. 9, 1992

[51] Int. Cl.⁵ .................. B09B 3/00; E02D 3/11
[52] U.S. Cl. .................... 405/128; 405/131
[58] Field of Search ........... 405/128, 129, 131, 258; 166/248

[56] References Cited

U.S. PATENT DOCUMENTS

| | | |
|---|---|---|
| 4,376,598 | 3/1983 | Brouns et al. |
| 4,435,292 | 3/1984 | Kirk et al. |
| 4,593,760 | 6/1986 | Visser et al. |
| 4,660,639 | 4/1987 | Visser et al. |
| 4,670,634 | 6/1987 | Bridges et al. |
| 4,842,448 | 6/1989 | Koerner et al. |
| 4,984,594 | 1/1991 | Vinegar et al. |
| 5,011,329 | 4/1991 | Nelson et al. |
| 5,076,727 | 12/1991 | Johnson et al. |
| 5,114,497 | 5/1992 | Johnson et al. ............ 405/128 X |

Primary Examiner—David H. Corbin

[57] ABSTRACT

An Enhanced Deep Soil Vapor Extraction Process and Apparatus utilizes heaters placed into the soil at least to the depth of contamination and a vapor/condensate extraction system that withdraws volatilized contaminant vapors from the subsurface and any condensate that collects in the extraction well. Depending on the rate of formation of condensate in the well, a second conduit may be placed inside the well for the collection and removal of condensate by a downhole pump or a suction device located at ground surface. The process is directed towards contaminants trapped in or below the normal groundwater level. Groundwater extraction wells are also employed to create a "cone of depression", or local draw-down of the groundwater to expose those soils that are normally water saturated and thereby permit decontamination of such soils. Conduits may be placed within the groundwater extraction wells for the purpose of extracting groundwater.

9 Claims, 2 Drawing Sheets

ENHANCED DEEP SOIL VAPOR EXTRACTION PROCESS AND APPARATUS FOR REMOVING CONTAMINANTS TRAPPED IN OR BELOW THE WATER TABLE

FIELD OF THE INVENTION

The invention is directed to the in-situ withdrawal from subsurface soils of contaminant vapors which have been volatilized by in-situ heating. The invention is particularly directed to removal of contaminants trapped in or below the water table. The invention employs the use of an extraction well to remove the vapors along with any condensate or ground water which collects in the extraction well.

BACKGROUND OF THE INVENTION

A variety of methods have been proposed for the remediation of soil containing organic contaminants. Many of the proposed methods involve removal and subsequent incineration of soil with the attendant difficulties of treatment and/or disposal of off-gases. A major detriment to such processes, however, is the cost of evacuating and transporting the soil which can result in a total cost approaching several hundred U.S. dollars per ton of soil.

To avoid at least a portion of these costs, several types of in-situ processes have been proposed including vitrification of the soil by electrode heating, steam or hot air heating of the soil through an auger system or through stationary pipes, and radio-frequency or electrical heating of the soil by means of a surface heater.

Both an auger system for injecting steam or hot air and a process for steam injection through stationary pipes have been practiced commercially. These methods have a limited use, primarily in the decontamination of soil containing small areas of deep contamination such as localized spills or leakages at service stations. These methods are not as useful when applied to large areas of contaminated soil. Additionally, a process which uses steam to heat the soil is limited by the amount of condensate that can be tolerated in the soil without causing contaminants to be leached to the ground water, or at least clogging the soil pore volume with water which inhibits or restricts vapor or air flow. Also, soil temperature is limited so it is practical only for the more volatile chemicals.

Brouns et al, U.S. Pat. No. 4,376,598, disclose a vitrification process in which the soil is heated to approximately 1500° C. At or about this temperature the soil forms a glass-like mass which traps the contaminants therein. This process destroys organic contaminants. However, for inorganic contaminants, it is, in reality, a stabilization process rather than a decontamination process since the soil undergoing treatment has lost its physical and chemical identity.

Bridges et al, U.S. Pat. No. 4,670,634, disclose an in-situ thermal process wherein the thermal energy is supplied by radio-frequency heating. This process is particularly applicable to water-containing soils where the steam generated in the soil serves to strip the organic contaminants from the soil. A somewhat related process is disclosed by Assignee's U.S. Pat. No. 4,984,594 wherein the thermal energy is supplied by a relatively flat heater deployed at the surface of the soil. In this latter process, a lowered pressure is applied at the surface of the soil to remove vapors generated within the soil. This method is somewhat inefficient since significant vapor flow takes place only at the surface of the soil or within a "blanket" placed on the surface of the soil it covers. It would be of advantage to provide a more effective method of collecting and removing from heated soil the vapors formed when soil contaminated by organic contaminants is heated.

U.S. Pat. No. 4,842,448 issued to Robert M. Koerner et al on Jun. 27, 1989 discloses a method and apparatus for in-situ removal of contaminants from soil comprising a barrier having a permeable inner layer and an impermeable outer layer overlying the contaminated soil and a vacuum system for reducing pressure under the barrier and withdrawing contaminants from the contaminated soil.

In Assignee's co-pending application, Ser. No. 833,569, filed Feb. 7, 1992, which is a continuation of Ser. No. 427,427 filed Oct. 27, 1989, now abandoned, an in-situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet.

U.S. Pat. No. 4,435,292 discloses a portable system which can be installed at an area where a contaminating spill has occurred. After the area of the contamination has been determined, perforated pipes are inserted into the ground. Some of the wells are pressurized and others are evacuated simultaneously so as to increase the transfer of a flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plant wherein the contaminants are removed.

And, in Assignee's U.S. Pat. No. 5,076,727, moist warm air from a vapor treatment system is injected into wells which are screened (perforated) only at the contaminated depth forcing vapor flow only through the contaminated region. Between the injection wells is an extraction well which is also screened only at the contaminated depth. A vacuum is drawn on the extraction well through the contaminated soil, thereby entraining some of the contaminants. The contaminated, flushing vapor is then treated and recycled. A microwave/radio frequency (MW/RF) heating system heats the earth's surface and the contaminated soil, thereby enhancing volatilization of the contaminants and their removal via the vapor flushing system. By screening the wells only through the contaminated zone and maintaining the contaminated soil zone in a moist state, the entire energy of the system is focussed on the contaminated region.

In Assignee's copending application Ser. No. 627,479, filed Dec. 14, 1990, now U.S. Pat. No. 5,190,405, an in-situ method for removal of contaminants from soil imposes a vacuum on the soil through perforated heater wells that are positioned in the soil. The heater wells heat the soil to elevated temperatures by thermal conduction. The heater wells are permeable to vapors which emanate from the soil when heated and which are drawn towards the heater wells by the imposed vacuum. An impermeable flexible sheeting on the soil surface reduces the amount of air that is being pulled into the heater well from the atmosphere. A thermal insulator covers the soil surface and reduces heat losses from the soil surface. The heater wells are connected to a vacuum manifold for collection of vapors. A heat front moves away from the heater wells through the soil by thermal conduction, and the superposition of heat from a plurality of heater wells results in a more uniform temperature rise throughout the well pattern. Soil contaminants are removed by vaporization, in-situ thermal decomposition, oxidation, combustion, and by steam stripping. The heater wells and the nearby soil are extremely hot and many contaminants drawn into the wells will decompose with a residence time on the order of seconds. The heater well can also be packed with a catalyst that accelerates high temperature decomposition into simpler molecules. Water vapor and remaining contaminants may be incinerated in line or may be collected in a cold trap upstream from the vacuum pump.

In Assignee's co-pending application Ser. No. 705,712, filed May 23, 1991, now U.S. Pat. No. 5,193,934, an in-situ desorption system utilizes perforated or slotted pipe buried in the soil below the depth of contamination in the soil. The surface of the soil is covered with a layer of permeable insulation (to conserve heat and to provide a gas migration path on top of the soil) and a layer of impermeable material above the insulation. A vapor recovery/treatment system located at the surface consists of a method of inducing a vacuum between the impermeable layer and the soil surface (e.g., a vacuum pump or an induced draft fan) and a treatment system for the contaminated vapor (e.g., a cold trap, carbon adsorption, or incineration). Fuel and compressed air are fed to a pressurized combustion chamber and combusted, the combustion products flow into the buried pipe and are distributed through the contaminated soil. Heat from the pressurized combustion products causes the organic contaminants within the soil to vaporize, pyrolyze, decompose, or react with oxygen. Contaminants and their by-products are swept away by the combustion products into the vapor recovery/treatment system.

In Assignee's co-pending application Ser. No. 705,708, filed May 23, 1991, now U.S. Pat. No. 5,169,263, an improved in-situ soil heating process utilizes a submerged vapor recovery system comprising perforated or slotted pipes buried in the soil below the depth of contamination. The pipes may be buried in a manifold arrangement and may contain thermocouples to monitor temperature. A vapor recovery/treatment system is connected to the buried pipe network and includes a method of inducing a vacuum on the buried pipe network (e.g., a vacuum pump or an induced draft fan) and a treatment system for the contaminated vapor (e.g., a cold trap, carbon adsorption, or incineration). Heat is applied to the soil surface by a relatively flat, surface-conforming, resistance heater. Heat causes the organic contaminants within the soil to vaporize, pyrolyze, decompose or react with oxygen. The contaminants and their by-products are swept away by the air into the buried pipe network for further treatment or disposal.

In Assignee's application Ser. No. 675,377, filed Mar. 26, 1991, now U.S. Pat. No. 5,114,497, the soil is covered with vapor-impermeable insulation and a relatively flat heater. Heat passes into the soil from the heater but heat is also transferred to a major extent to locations below the surface of the soil through vertical soil-free passages. The heat serves to vaporize and/or decompose soil contaminants, initially at or near the passages. The gaseous contaminants or decomposition products thereof pass horizontally through the soil toward a vapor collector where the pressure has been reduced by a vacuum pump attached to the upward end of the collector. As the vapors flow horizontally through the soil they serve to transfer heat and to more uniformly heat the soil which results in more uniform and more complete decontamination of the soil being treated. The vapors collected flow upwardly through the vertical passage and through the openings in the heater and insulation. Before or after exiting the vapor collector, the vapors are treated, physically or chemically, to remove the environmentally undesirable vapors by a vapor separator.

U.S. Pat. No. 5,011,329 to Nelson et al discloses an in-situ decontamination method and apparatus for injecting a hot gas into boreholes formed in a contaminated soil area to vaporize the soil moisture and contaminants, and for collecting the vaporized contaminants at the surface of the soil. A burner heats pressurized gases and mixes the same with combustion gases for injection into the contaminated zone. A central collection system recovers the vaporized contaminants and couples such vapors to an on-site incinerator for disposal. Controlled heating of the injection gas is effective to sequentially remove different types of contaminants, as well as to provide in-situ oxidation of other contaminants, while minimizing recondensation of the soil vapors. Wellbore casings are especially adapted for injecting the gas in predetermined patterns. In addition, a heater and incinerator assembly utilizes a single burner for both heating the dry gas and for incinerating the vapor contaminants.

In U.S. Pat. Nos. 4,593,760 and 4,660,639 to Visser et al, volatile contaminants are removed from the vadose zone of contaminated ground by pumping volatilized contaminants from the vadose zone using one or more vacuum extraction wells at ambient temperature.

All of the above-described systems are directed to soil remediation where the contaminated soil is in the vadose zone.

SUMMARY OF THE INVENTION

An Enhanced Deep Soil Vapor Extraction Process and Apparatus according to the present invention comprises heaters placed into the soil at least to the depth of contamination and a vapor/condensate extraction system that withdraws volatilized contaminant vapors from the subsurface and any condensate that collects in the extraction well. Depending on the rate of formation of condensate in the well, a second conduit may be placed inside the well for the collection and removal of the condensate by a downhole pump or a suction device located at ground surface. The process is directed towards contaminants trapped below the normal groundwater level. Groundwater extraction wells are also employed to create a "cone of depression", or local draw-down of the groundwater, to expose those soils that are normally water saturated. Conduits may be placed within the groundwater extraction wells for the purpose of extracting groundwater.

DETAILED DESCRIPTION OF THE INVENTION

This invention is intended for the remediation of contaminants that are not practically treatable by in-situ vapor extraction at ambient temperatures due to their low vapor pressures. Such contaminants include diesel and fuel oils, crude oil, polychlorinated biphenyls (PCB's), polynuclear aromatics (PNA's), substituted phenols, and halogenated hydrocarbons such as pesticides.

Figure 1:
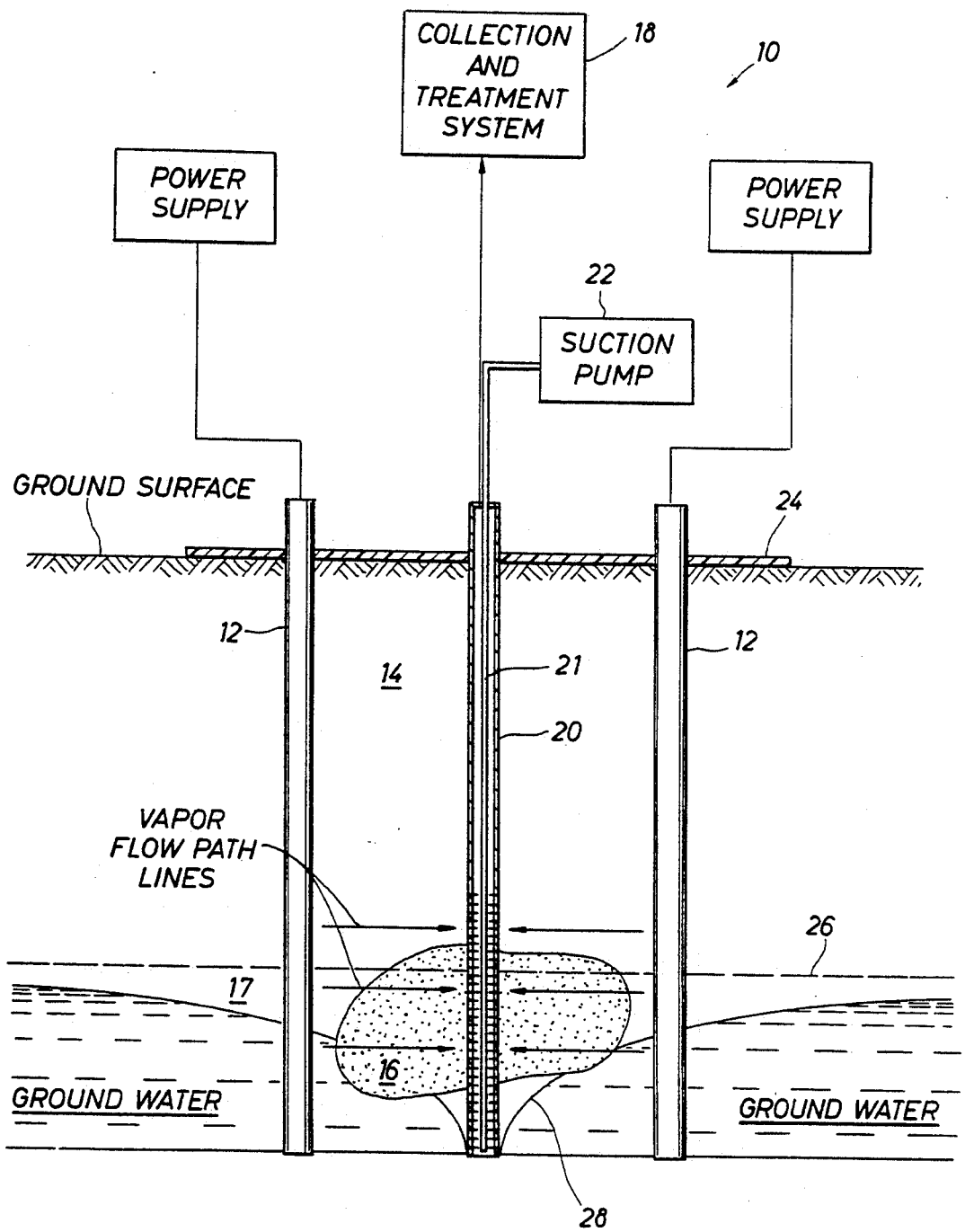
FIG. 1 depicts a sectional view of one embodiment of the invention.
Figure 2:
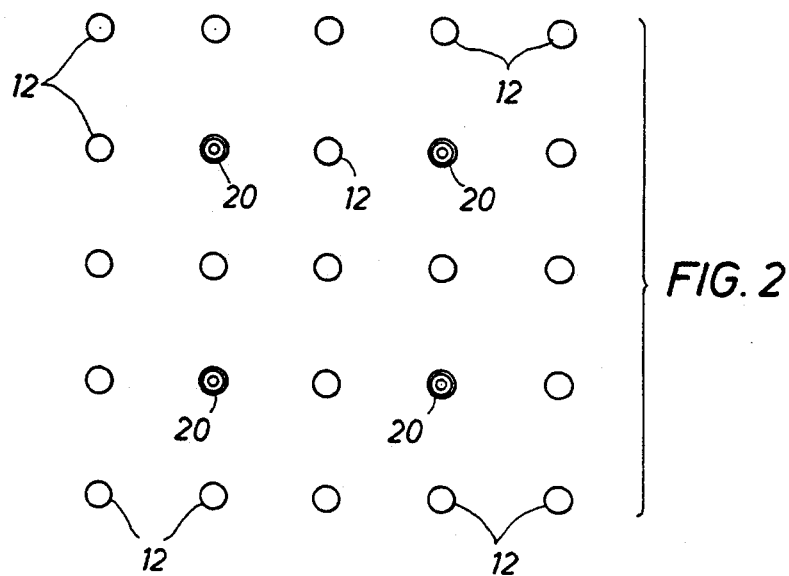
FIG. 2 depicts a plan view of the heater and extraction well layout of the invention.

FIG. 1 depicts one possible configuration of the present invention shown generally at 10, which comprises heaters 12 placed into the soil 14 through and below the depth of contamination 16 and a vapor/condensate extraction system 18 that withdraws volatilized contaminant vapors from the subsurface and any condensate that collects in the extraction well 20. A number of heaters 12 and vapor extraction wells 20 may be combined as illustrated in FIG. 2. The heaters 12 may be commercially available cylindrical electrical heaters, such as nichrome/magnesium oxide tubular heaters, but heat may also be generated by other means, such as by the combustion of hydrocarbon vapors within the wells. The heaters 12 may be inserted into the soil 14 vertically (as in FIG. 1) or horizontally (as in FIG. 3) by known drilling techniques, and may be perforate or imperforate to air flow through the heater 12 into the soil formation 14. The vapor/condensate extraction system 18 consists of at least one vapor extraction well (or conduit) 20 into which contaminant vapors are induced to flow (as shown by the arrows) as the result of a vacuum applied to the well 20 by a suction device such as a blower or vacuum pump in the system 18 thereby causing the "cone of depression" 28 in the groundwater. Depending on the rate of formation of condensate in the well, a second conduit, such as a tube 21, may be placed inside the well 20 for the collection and removal of condensate. This second conduit 21 may be connected to a downhole pump (not shown) or to a suction device 22 located at ground surface. Air inlet wells (not shown) may also be placed in the formation; their purpose is to allow the flow of air, or to force air into the soil formation. The use of such wells may allow the user to better direct vapor flow through the contaminated soil region. Impermeable surface seals 24 may also be used to either insulate the soil surface or to control the vapor flow path.

Figure 3:
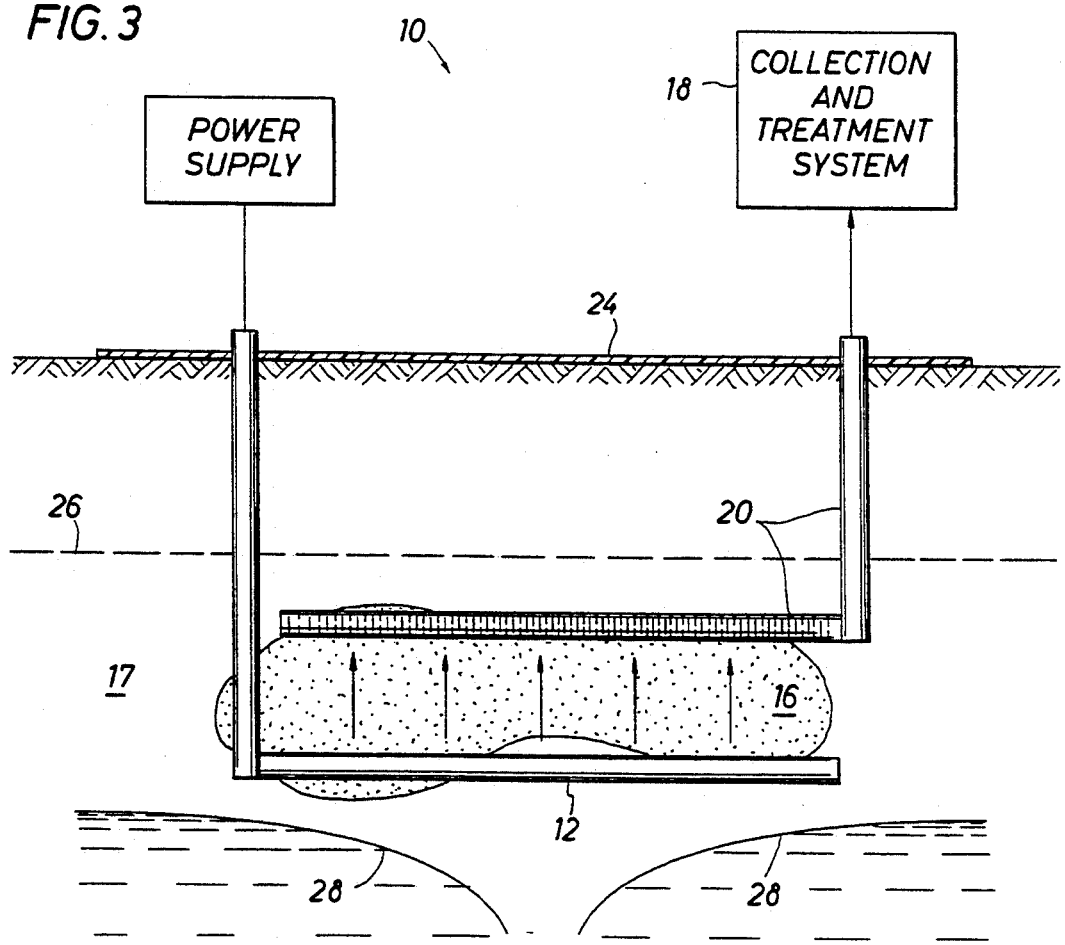
FIG. 3 depicts a sectional view of another embodiment of the invention.

Another embodiment of the system 10 is depicted in FIG. 3 wherein the heater 12 and the perforated portion of extraction well 20 are located below, and essentially horizontal to, the groundwater level 26. In this configuration, a separate extraction well (not shown), which may or may not include a second conduit 21 (not shown), is required to extract condensate and create the "cone of depression" 28.

The system 10 collects the vapors and condensate from the extraction well(s) 20 and sends them to a collection/treatment system 18 which removes or destroys the contaminants before the vapors are discharged to the atmosphere. Vapors may be treated by a number of devices including, but not limited to, thermal oxidation units, catalytic oxidation units, carbon beds, scrubbers, or condensers.

The system 10 is directed towards contaminants trapped in or below the normal groundwater having a static level 26. Groundwater extraction wells 20 are employed to create a "cone of depression" 28, or local draw-down of the groundwater to expose those soils 16, 17 that are normally water saturated thereby permitting removal of contaminants remaining in the newly exposed soils. Similarly, as shown in FIG. 1, conduits 21 may be placed within the vapor/condensate extraction wells 20 and connected to removal apparatus such as a suction pump 22 for the purpose of extracting groundwater.

The vapor/condensate extraction wells 20 used in the system 10 may also be heated to minimize the production of condensate in the extraction well.

The system 10 is designed to treat those semi-volatile and non-volatile contaminants that are not volatile enough at ambient temperatures (0°-20° C.) to be removed practically by soil vapor extraction or in-situ soil venting. Such contaminants include diesel and fuel oils, crude oil, polychlorinated biphenyls (PCB's), polynuclear aromatics (PNA's), substituted phenols, and halogenated hydrocarbons such as pesticides. Soils are heated by a combination of conductive and convective heating, thereby increasing the vapor pressures of contaminants, which in turn increases the rate of volatilization when vapor flow is induced.

Table 1 illustrates the increase in vapor pressure for several semi-volatile and non-volatile compounds with temperature increases and the projected increase in removal rate vs. conventional soil venting practices.

TABLE 1

| | | Predicted Enhancement in Removal Rate | | | | | |
|---|---|---|---|---|---|---|---|
| | | 20° C. | | 100° C. | | 200° C. | |
| Compound | $T_B$ [°C.] | P [atm] | R | P [atm] | R | P [atm] | R |
| dichloropropane | 88 | 0.0709 | 1 | 1.44 | 20 | 12.4 | 175 |
| octane | 125 | 0.014 | 1 | 0.47 | 34 | 5.5 | 393 |
| napthalene | 217 | $9.3 \times 10^{-5}$ | 1 | 0.0245 | 263 | 0.66 | 7120 |
| hexadecane | 287 | $9.4 \times 10^{-8}$ | 1 | 0.0018 | 19000 | 0.0964 | $1 \times 10^6$ |

$T_B$ - Boiling Point at 1 atm
R - predicted enhancement in removal rate as compared to conventional soil venting at 20° C., based on vapor pressure changes.

An insulating means 24 is employed to reduce heat loss from the heating means to the air above the soil undergoing decontamination. Light weight and durability are desirable characteristics of the soil insulating means. The required thickness of the sheet will depend upon the temperature at which the soil heating is conducted as well as the nature of the surface of the soil. For ease of positioning, a thin sheet is preferred although thicker sheets provide greater strength and better insulation which may compensate for the greater cost. Suitable material may be, for example, ceramic fiber or high-grade fiberglass.

The temperature to which the soil 16 is heated by transfer of thermal energy from the heating means 12 through the soil will depend largely upon the moisture content of the soil and the nature of the particular soil contaminants. Steam stripping occurs any time the soil has a positive moisture content. In soils of relatively low moisture content, or which contain organic contaminants of relatively high boiling points, it is necessary to employ higher soil heating temperatures. Theoretically, the process of the invention is capable of generating soil temperatures as high as 1000° C. and thus is useful for removing soil contaminants having high boiling points such as haloorganic pesticides, jet and diesel fuels, crude oil, and polychlorinated benzenes (PCBs). In the case of some soil contaminants 16, the contaminant will not readily vaporize under the applied thermal energy but will decompose to form gaseous products such as carbon dioxide and water which, in effect, "removes" the contamination by means of its destruction. Required treatment temperatures are contaminant-specific and are related to their respective boiling points which are, for most compounds of current interest, in the range of 100°–400° C.

When produced, the sub-surface vapors flow through the earth to the vapor collection means which is typically a series of perforated pipes 20 extending through the earth below the contaminated soil and terminating in or preferably below the contaminated zone 16. This flow of vapor through the contaminated soil 16 to the perforations in well 20 in the direction of the arrows serves to promote even heating throughout the soil and provides for more uniform and more efficient decontamination of the soil. The flow of vapor through the pipes 20 is encouraged by pressure reducing means, typically a vacuum pump, acting in cooperation with a vapor collection manifold means to lower the pressure at or around the vapor collection means 18. A carbon bed vapor collection means is operated at ambient temperature; a condenser or incinerator is operated at lower or higher temperatures, respectively. The number and location of the vapor collection means can be varied but there must be at least one vapor collection means and generally there will be a plurality of vapor collection means.

The pressure reducing means is typically a vacuum pump or aspirator connected to the manifold of one or more of the vapor collection pipes 20. The pressure reducing means is positioned at a location at the surface and is connected to the vapor collection means by at least one conduit. The precise pressure to which the pressure reducing means lowers the ambient pressure at or near the vapor collection means is determined by soil characteristics and geometry of the heaters. The theoretically achievable range of vacuums is 0–14.7 psia. Practically achievable vacuums are typically in the range of 5–14.7 psia.

Also in line with the vapor collection means and the pressure reducing means are vapor separation means which serve to separate the environmentally undesirable vapors from those vapors which may be released into the atmosphere without substantial adverse environmental consequences. In one embodiment, the vapor separation means is a scrubber or an adsorber which serves to remove by chemical or physical methods the undesirable vapor components. In a second embodiment the vapor separation means comprises a catalyst bed which serves to decompose the contaminant vapors passing through the bed into vapors which can be released into the atmosphere without adverse effect. The scrubber, usually a recirculating liquid scrubber, or the adsorber, which is often a bed of activated carbon, is located at a position such that the vapors from the vapor collection means pass through this embodiment of the vapor separation means after collection by the vapor collection means and before or after passage through the pressure reducing means. The scrubber or adsorber is operated at a moderate temperature, e.g., from about $-20°$ C. to about 120° C., and it may be necessary to cool the vapors leaving the vapor collection means before entering either of these illustrative vapor separation means. In an alternate embodiment, the vapor separation means is a catalytic degrader serving to remove, by chemical degradation, the undesirable components of the collected vapors. Such a catalytic unit is operated at an elevated temperature, e.g., from about 200° C. to about 400° C., and the catalytic bed is typically an inorganic oxide such as aluminum oxide or an iron oxide or one of the class of inorganic oxides commonly referred to as clay. The catalytic degrader is suitably located such that the contact with the vapors undergoing separation will occur after exiting the vapor collection means and before or after passing through the pressure reducing means. Alternatively, however, the catalytic degradation bed may be positioned within the vapor collection means by placing a catalytic bed in the vertical passage of the vapor collection means to chemically degrade the contaminant vapors as collected at a sub-surface location. By any embodiment of the vapor separation means, an environmentally acceptable vapor is obtained which may then be released to the atmosphere. Additionally, thermal incineration, with or without a supplementary fuel, may also be used. Vapor separation may also be achieved by combinations of the above means.

What is claimed is:

1. A process for removal of contaminants trapped in soil below the groundwater level comprising the steps of:
    inserting a heater in the earth, said heater traversing a source of groundwater and through contaminated soil lying below said groundwater;
    inserting a vapor extraction well in the earth, through said groundwater and through said contaminated soil therebelow;
    creating a negative pressure in said vapor extraction well;
    heating said heater to increase the vapor pressure of the contaminants;
    drawing down said groundwater into said extraction well, said draw-down causing soils that are normally water saturated to be exposed; and
    withdrawing contaminated vapors through said extraction well.

2. The process of claim 1 further comprising the step of placing a conduit in said extraction well for removing condensate.

3. The process of claim 1 further comprising applying heat to said extraction well.

4. The process of claim 1 further comprising perforating said extraction well.

5. An apparatus for removing contaminants trapped in soil located below the groundwater level comprising:
heater means penetrating the earth through a source of groundwater and through contaminated soil lying below said groundwater;
means for supplying heat to said heater;
vapor extraction means including an extraction well penetrating the earth through said source of groundwater and through contaminated soil lying below said groundwater; and
means for creating a vacuum in said extraction means for withdrawing vapors therethrough.

6. The apparatus of claim 5 further comprising conduit means for withdrawing condensate from said extraction well.

7. The apparatus of claim 5 further comprising means for heating said extraction well.

8. The apparatus of claim 5 wherein said extraction means are perforated.

9. The apparatus of claim 5 wherein at least a portion of said heater means lies essentially horizontal to the earth's surface and below said contaminated soil.

* * * * *